(12) United States Patent
Beck et al.

(10) Patent No.: US 8,281,321 B2
(45) Date of Patent: Oct. 2, 2012

(54) METHOD, SYSTEM AND STORAGE MEDIUM FOR IMPLEMENTING A MESSAGE BOARD CACHE SYSTEM

(76) Inventors: Marc T. Beck, Seattle, WA (US); Craig S. Brown, Bainbridge Island, WA (US); Christopher E. Mason, Bellevue, WA (US)

( * ) Notice: Subject to any disclaimer, the term of this patent is extended or adjusted under 35 U.S.C. 154(b) by 1154 days.

(21) Appl. No.: 12/043,414

(22) Filed: Mar. 6, 2008

(65) Prior Publication Data

US 2008/0229333 A1 Sep. 18, 2008

Related U.S. Application Data

(60) Provisional application No. 60/893,389, filed on Mar. 7, 2007.

(51) Int. Cl.
*G06F 9/44* (2006.01)
*G06F 17/00* (2006.01)
(52) U.S. Cl. ........................................ 719/318; 707/803
(58) Field of Classification Search .................. 719/330; 709/217
See application file for complete search history.

(56) References Cited

U.S. PATENT DOCUMENTS

| | | | | |
|---|---|---|---|---|
| 5,699,539 A * | 12/1997 | Garber et al. | ...................... | 711/2 |
| 5,826,253 A * | 10/1998 | Bredenberg | ........................... | 1/1 |
| 6,453,021 B1 * | 9/2002 | Ripley et al. | ............... | 379/88.11 |
| 6,968,424 B1 * | 11/2005 | Danilak | ......................... | 711/113 |
| 7,343,396 B2 * | 3/2008 | Kausik et al. | ................. | 709/217 |
| 2005/0108202 A1 * | 5/2005 | Nishikubo | ......................... | 707/3 |
| 2006/0026154 A1 * | 2/2006 | Altinel et al. | ..................... | 707/5 |
| 2006/0123084 A1 * | 6/2006 | Heidloff et al. | ............... | 709/206 |
| 2006/0212427 A1 * | 9/2006 | Heidloff et al. | ................... | 707/3 |

* cited by examiner

*Primary Examiner* — Andy Ho
*Assistant Examiner* — Abdou Seye
(74) *Attorney, Agent, or Firm* — Gates & Cooper LLP

(57) ABSTRACT

A message board cache system comprising: a database containing message board information; a notification system in communication with the database, the notification system generating a notification when data in the database is altered or deleted; a web application executing a message board interface, the web application receiving the notification from the notification system and the data altered or deleted; a cache implementation in communication with the web application, the web application deleting an item from the cache implementation upon receiving the notification that the data has been altered or deleted from the database.

19 Claims, 3 Drawing Sheets

METHOD, SYSTEM AND STORAGE MEDIUM FOR IMPLEMENTING A MESSAGE BOARD CACHE SYSTEM

CROSS-REFERENCE TO RELATED APPLICATIONS

This application claims the benefit of U.S. provisional patent application Ser. No. 60/893,389 filed Mar. 7, 2007, the entire contents of which are incorporated herein by reference.

BACKGROUND

The invention relates generally to message board systems and in particular to a cache system for providing high-speed retrieval of information stored in a database. Message board systems are available on a myriad of subjects. Typically, a user accesses a message board system to interact with other users and to obtain information about an area of interest. Unfortunately, as explosive growth continues in both access to the Internet and number of users, the sheer volume of requests to a message board can result in longer response times to users. As the number of users and the amount of information available for retrieval increases, more efficient systems are needed to provide high-speed information retrieval.

SUMMARY

Exemplary embodiments include a message board cache system comprising: a database containing message board information; a notification system in communication with the database, the notification system generating a notification when data in the database is altered or deleted; a web application executing a message board interface, the web application receiving the notification from the notification system and the data altered or deleted; a cache implementation in communication with the web application, the web application deleting an item from the cache implementation upon receiving the notification that the data has been altered or deleted from the database.

Additional exemplary embodiments include methods and computer program products for implementing a message board cache system.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

DETAILED DESCRIPTION

The message board cache system is a high-speed retrieval system for database-stored information. In exemplary embodiments the system uses B-trees built on top of a custom virtual memory manager for high-speed access to data. Reference is made to a B-tree as a data format, which may include B-trees, B+-trees, B#-trees, B*-trees, etc. and is referred to as a B-tree for simplicity. Data is kept in sync with a database by a notification system, i.e., when data is added, altered, or deleted in the database, the database notifies all running instances of the message board cache system on the network, resulting in a re-load of the data upon a subsequent request for it. This allows for absolute minimum database access, as cache entries live until the data is actually changed, and the system never need to A) expire cache entries according to time, or B) poll the database to find out if data has changed.

Figure 1:
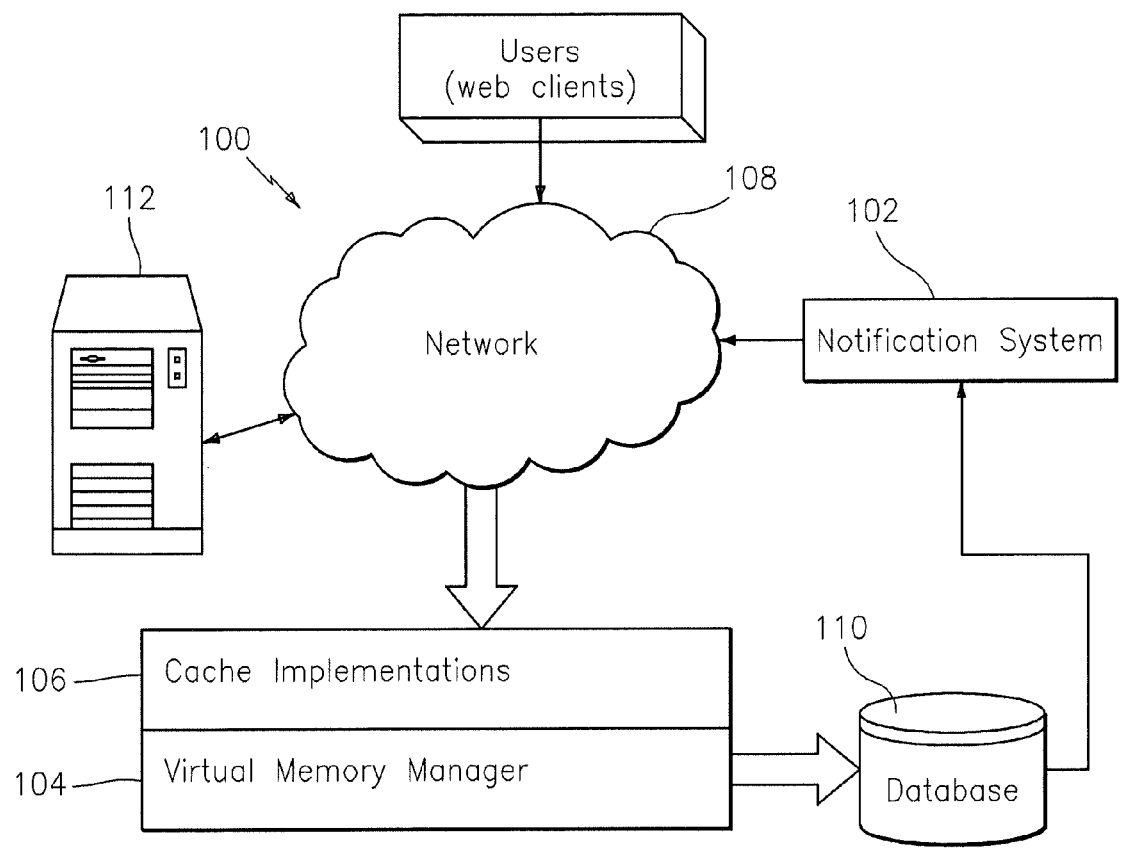
FIG. 1 is a block diagram of an exemplary message board cache system.

The purpose of the message board cache system is twofold, to prevent unnecessary database access and to minimize the amount of time necessary to serve a web page. FIG. 1 illustrates a message board cache system 100 that includes three distinct parts. These are the notification system 102; the virtual memory manager 104; and the cache implementations 106. Users access the message board cache system via a network 108 (e.g., Internet) through a web application executing on multiple servers 112. The web application provides the interface for the message board. Database 110 stores data for the message board, which is transferred to the cache implementation 106 to improve access to the data. It is understood that elements of FIG. 1 may be implemented using general purpose computers and/or servers executing computer programs stored on a computer readable medium.

The notification system 102 is implemented as a User Datagram Protocol (UDP) broadcast, originating at the database 110, of an XML element. The format of this element is <name tag1="value" tag2="value" . . . /> where name, tags, and values are arbitrary. In an exemplary embodiment, the element has a maximum size of 384 bytes, thus allowing for a single UDP packet to be sent across an Ethernet network. The receiving portion of the system (built into the message board cache system) will read these elements, and is programmed to clear dirty records from the cache or perform specific actions according to the needs of the web application.

The database 110 is then built so that changes to data cause notification system 102 to send notifications specific to the data that has changed. An example would be a trigger on a table that sends a notification where Name equals the name of the table, and a single tag would be ID, with the value of the particular record that has changed. Since these items are arbitrary, programmers can develop cache systems specific to their application very simply.

The virtual memory manager 104 (VMM) portion of the message board cache system 100 uses a file on a locally accessible hard drive as its primary storage. In exemplary embodiments, up to 4 GB of physical memory may be allocated (configurable) to use as cache for the virtual memory to improve performance.

In exemplary embodiments, the VMM 104 is built with 64 bit pointer handling, allowing for 16 PB (16,384 TB, or 16,777,216 GB) of virtual memory to be accessed. It utilizes a least recently used (LRU) algorithm to ensure that the minimum number of physical disk accesses required under load, as more regularly pieces of information are not likely to be reduced to least recently used status, and the current information will be in physical RAM.

It is desirable to have data retrieved from the cache implementation 106. When disk I/O cannot be avoided, the I/O is performed via a single call to a read multiple sectors function built onto the hard drive controller, and transferred to physical RAM via dedicated DMA (direct memory access) hardware. This is the fastest possible way to transfer data to and from a hard drive forming database 110, and is limited only to the actual read rate of the physical drive itself. With off the shelf hardware, the transfer rate is in excess of 16 MB of data per second. Specialized hardware is currently available that can reach transfer rates as high as 133 MB per second.

The cache implementation 106 includes a set of libraries, built as templates, which use the memory provided by the virtual memory manager. There are three variants of the libraries. In one embodiment, a B-Tree key/value system is used wherein a given value can be saved or retrieved for a given key. In an alternate embodiment, a B-Tree key/file system is used wherein a block of memory (binary) can be saved or retrieved for a given key. In yet another embodiment, a file system is used wherein a single binary file can be saved or retrieved. Building the cache items as C++ templates allows for a cache to be implemented by simply instantiating the class with the key and value types.

The message board cache system may be built in two modules, one running on a web server 112, and one running on a database server 110. The database server portion includes the notification system implemented as an extended stored procedure running, for example, under Microsoft™ SQL Server. It is executed by calling the stored procedure with at least one parameter, "@Name". This will be the name used for the XML node that is transferred. Additional parameters may be passed in the form of "@attributename=value". @attributename and value are arbitrary, with the exception that @attributename cannot be "@Name", and value cannot contain the double quote ("), less than (<), or greater than (>) characters. These additional parameters will be added to the XML node as attributes. For example, calling master . . . xp_ScoutNotification@Name=
        'Ex'@(A1='Attr1'@A2=17 will transmit a UDP packet on port 9998, to BROADCAST_ADDR (255.255.255.255) that contains the data <Ex A1="Attr 1"A2="17"/>

All computers on the network listening to broadcasts on port 9998 will receive this data, and be programmed to take specific action accordingly.

In the message board cache system 100, triggers and stored procedures are used to send these broadcasts when data is modified in database 110. This allows the web servers 112 hosting the web applications to load a piece of information once, and to keep a copy of it until the data actually changes. This means that the database 110 will only have to serve each piece of information once per web server 112, reducing the load on the database 110 tremendously in applications that have high read to write ratio.

A web server 112 hosts the web application and is implemented as a shared web server component, which in an exemplary embodiment, is a .NET2.0 module. It is understood that other modules may be used (e.g., a .NET 3.5 module) and embodiments are not limited to particular web server components. On startup of the web server application, the VMM 104 is initialized, and then the cache trees are built. The cache implementation 106 uses the VMM 104 for their storage, allocating blocks of memory from the VMM 104 as it needs them. The web server application then attempts to retrieve items from the cache implementation 106 on customer request. When an item is not found in the cache implementation 106, the web application loads the item from the database 110 and adds it to the cache implementation 106. If at any time, the web application receives a notification from the notification module 102, the web application deletes the cache item(s) that have been modified or deleted. The next time that a request for that item is received, the web application will not find it in the cache implementation 106, and will load it from the database 110 and add the item to the cache implementation 106.

The VMM 104 is built as a file on a local memory (e.g., hard drive), with a block of physical memory buffer for caching the file's data. The file is allocated and sized at application initialization, and is kept open during the lifetime of the application. It is opened such that it is accessed via sectors, not by file position. The file is segmented into pages called extents. The size of an extent is determined by the least common multiple of the size of the processors memory page and the size of an allocation unit of the format on the hard drive. This guarantees that all transfers to and from the hard drive are sector multiples as well as memory page multiples. A sector multiple is used when reading and writing sectors directly, as the entire sector is transferred at one time. Additionally, multiple contiguous sectors can be read/written with a single command. Processor memory page multiples are used for use of DMA hardware.

Internal memory used for caching is segmented into pages called intents. The size of an intent is the same as the size of an extent, and is mapped 1:1 with an extent from the file. The memory page size (from the formula to calculate the extent size) is required for DMA hardware to operate, as it works in memory pages only, partial pages cannot be used with DMA.

On initialization, the VMM 104 creates a map of used/unused sectors in memory, and associates the available intents with the $1^{st}$ n extents. When the cache implementation 106 allocates a block, the VMM 104 uses these extents (and their associated intents) starting from Extent 0. When an extent is requested that is not associated with an intent, it locates the intent that is the least recently used. It then writes the intents data to the extent (in the file) with which it is associated. The intent is then associated with the requested extent, and the data from that extent is loaded into the intent. The address of the intent is then used by the web application.

Figure 2:
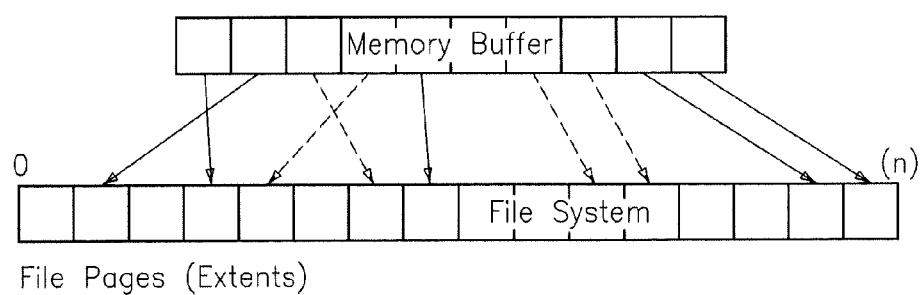
FIG. 2 illustrates operation of an exemplary virtual memory manager.

When transferring data to and from the drive, the VMM 104 calls the disk's driver, giving it the ID's of the sectors to read/write, and the memory page (segment portion of a segment:offset 16/16-bit pointer) to read from/write to. Modern hardware will use DMA transfer to copy the data to/from the hard drive's controller card, and will transfer the data to/from the disk with a single operation. This type of data transfer does not require the use of the computer's processor, leaving the processor available for execution of the web application. FIG. 2 is a simple diagram illustrating the memory/disk mapping to extents in the file pages.

The cache implementation 106 is the layer which implements the caches built for the message board cache system. The caches implemented allocate all necessary memory directly from the VMM 104, giving them a much larger capacity than would be available with memory alone. There are three types of caches, single file, item, and file.

Figure 3:
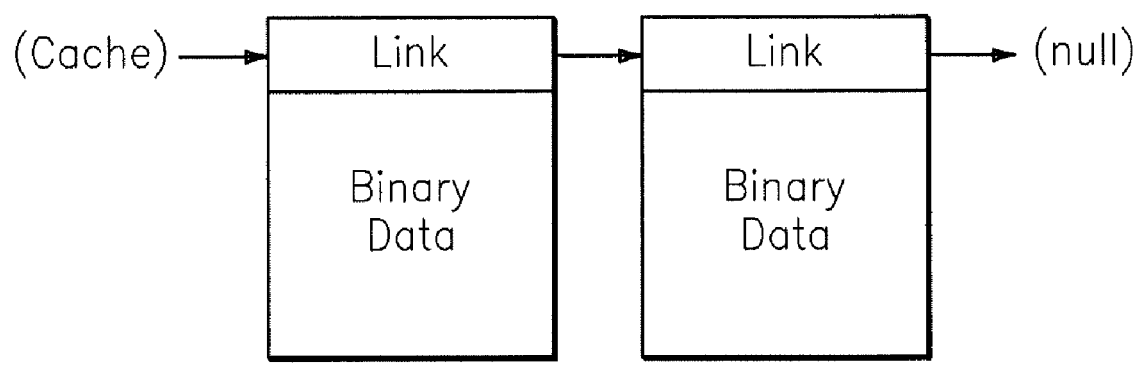
FIG. 3 illustrates exemplary caches for the message board cache system.

The single file cache is used to store a single block of binary information. The cache keeps the extent identifier of the $1^{st}$ extent in the file, the last access date of the file (read or write) and the length of the file. Each extent contains the extent identifier of the next extent in the chain, or −1 if this is the last page in the chain. FIG. 3 illustrates the single file cache arrangement showing linked extents.

Figure 4:
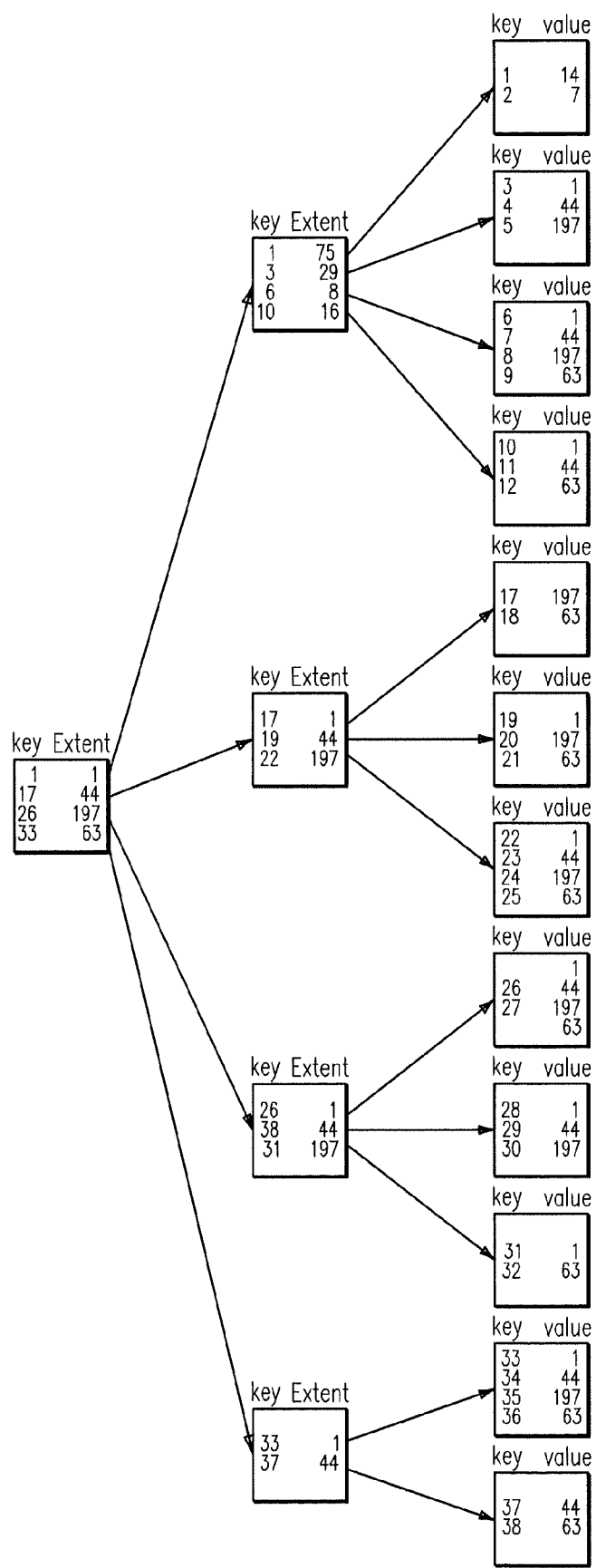
FIG. 4 illustrates an exemplary binary tree for the message board cache system.

The item cache is a B-tree of key/value pairs. This allows for quick access to specific items even when large numbers of entries are in the cache. The basic form of a B-tree is shown in FIG. 4. The pages are formatted with a type (leaf or branch), number of entries, max number of entries allowed, extent id of the parent page (−1 if none), and the extent id's of the previous and next pages in at the same level (in FIG. 4, the pages above and below a selected page). Each page of the B-tree is a single extent, and the number of items that will fit on the page is determined by the size of the extent, size of the key and size of the value. In addition, there is an array of 32 bit integers equal to the number of items on the page. These are used in the following manner.

Instead of rearranging items on the page when a new item is inserted, the new item is inserted into the first unused location on the page. The array is then manipulated so that their values are the location of the items on the page in sorted order. That is, an item identified as Item[Offset[number]] is the item at location [number] in sorted order. This prevents data movement, and makes the tree much more efficient. To allow for caching of any type of data, the following restrictions may apply. The key should implement greater than (>), less than (<), equals (==) and not equals (!=) and assignment (=) operators. The values should implement the assignment operator.

The file cache is a combination of the two caches above, that is, it is an item cache where the value of an item is the file information ($1^{st}$ extent, file access time, and length), built in the same way as the single file cache above. This allows for large numbers of very large or variable length items to be accessed via a tree. Once the data is located, the cache then accesses the extent(s) of the file in sequential order, allowing the reading/writing of the cache data.

As described above, the present invention can be embodied in the form of computer-implemented processes and apparatuses for practicing those processes. In an exemplary embodiment, the invention is embodied in computer program code executed by the server of the call data storage system. The present invention may be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A message board cache system comprising:
    a database including storage containing message board information;
    a notification system in communication with the database, the notification system automatically generating a notification when data in the database is altered or deleted;
    a web application operating on one or more web servers executing a message board interface, the web application receiving the notification from the notification system and the data altered or deleted;
    a cache implementation including a memory in communication with the web application, the web application automatically deleting an item from the cache implementation upon receiving the notification that the data has been altered or deleted from the database; and
    a virtual memory manager managing the memory for the cache implementation, wherein:
        the memory is organized into extents;
        the cache implementation is organized into intents;
        the size of an intent equals the size of an extent; and
        the virtual memory manager maps unused sectors in memory and associates available intents with extents.

2. The message board system of claim 1 wherein:
    the cache implementation is arranged as a B-tree of key and value pairs, each key and value pair identifying a page in the B-tree.

3. The message board system of claim 2 wherein:
    each page of the B-tree is formatted with a leaf type or branch type, a number of entries, an extent identifier, an extent identifier of a parent page, an extent identifier of a previous page in the same level and an extent identifier of a next page in the same level.

4. The message board system of claim 3 wherein:
    the extent identifier of a parent page is a default value if the page has no parent page.

5. The message board system of claim 1 wherein:
    the cache implementation is arranged as single file linked extents, each extent containing an extent identifier of the next extent, each extent storing a block of binary data.

6. The message board system of claim 5 wherein:
    the extent identifier of the next extent is a default value if the extent is the last extent in a chain.

7. The message board system of claim 1 wherein:
    the cache implementation is arranged as a B-tree of key and value pairs, each key and value pair identifying an item in the B-tree;
    each item in the B-tree is arranged as single file linked extents, each extent containing an extent identifier of the next extent, each extent storing a block of binary data.

8. The message board system of claim 1 wherein:
    when the one or more web servers receives request for data not present in the cache implementation, the data is retrieved from the database and the one or more web servers adds the data to the cache implementation.

9. The message board system of claim 1 wherein:
    each intent maps one-to-one to an extent.

10. A method for providing a message board cache, the method comprising:
    providing a database containing message board information;
    automatically generating a notification when data in the database is altered or deleted;
    providing a web application executing a message board interface, the web application receiving the notification and the data altered or deleted;
    automatically deleting an item from a cache implementation upon receiving the notification that the data has been altered or deleted from the database; and
    managing memory for the cache implementation, wherein:
        the memory is organized into extents;
        the cache implementation is organized into intents;
        the size of an intent equals the size of an extent; and
        the managing memory includes mapping unused sectors in memory and associating available intents with extents.

11. The method of claim 10 wherein:

the cache implementation is arranged as a B-tree of key and value pairs, each key and value pair identifying a page in the B-tree.

12. The method of claim 11 wherein:

each page of the B-tree is formatted with a leaf type or branch type, a number of entries, an extent identifier, an extent identifier of a parent page, an extent identifier of a previous page in the same level and an extent identifier of a next page in the same level.

13. The method of claim 12 wherein:

the extent identifier of a parent page is a default value if the page has no parent page.

14. The method of claim 10 wherein:

the cache implementation is arranged as single file linked extents, each extent containing an extent identifier of the next extent, each extent storing a block of binary data.

15. The method of claim 14 wherein:

the extent identifier of the next extent is a default value if the extent is the last extent in a chain.

16. The method of claim 10 wherein:

the cache implementation is arranged as a B-tree of key and value pairs, each key and value pair identifying an item in the B-tree;

each item in the B-tree is arranged as single file linked extents, each extent containing an extent identifier of the next extent, each extent storing a block of binary data.

17. The method of claim 10 wherein:

when the web application receives request for data not present in the cache implementation, the data is retrieved from the database and the web server adds the data to the cache implementation.

18. The method of claim 10 wherein:

each intent maps one-to-one to an extent.

19. A computer program product for providing a message board cache, the computer program product comprising:

a storage medium readable by a processing circuit and storing instructions for execution by the processing circuit for performing a method comprising:

providing a database containing message board information;

automatically generating a notification when data in the database is altered or deleted;

providing a web application executing a message board interface, the web application receiving the notification and the data altered or deleted;

automatically deleting an item from a cache implementation upon receiving the notification that the data has been altered or deleted from the database; and managing memory for the cache implementation, wherein:

the memory is organized into extents;

the cache implementation is organized into intents;

the size of an intent equals the size of an extent; and the managing memory includes mapping unused sectors in memory and associating available.

* * * * *